United States Patent
Holmqvist

(10) Patent No.: US 6,919,814 B1
(45) Date of Patent: Jul. 19, 2005

(54) SYSTEM AND METHOD FOR PROVIDING ANCILLARY PAGE INFORMATION

(75) Inventor: Ryan S. Holmqvist, Bethlehem, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/488,327

(22) Filed: Jan. 20, 2000

(51) Int. Cl.[7] .............................................. H04Q 7/14
(52) U.S. Cl. ....................... 340/731; 340/7.22; 455/415
(58) Field of Search ............................... 340/7.31, 7.22, 340/7.28, 7.53, 7.2, 7.24; 455/415; 379/142.06, 207.13, 209.01

(56) References Cited

U.S. PATENT DOCUMENTS

| | | | | |
|---|---|---|---|---|
| 5,561,703 A | * | 10/1996 | Arledge et al. ............. 340/7.29 |
| 5,592,531 A | * | 1/1997 | Cheng et al. .............. 340/7.31 |
| 5,668,852 A | * | 9/1997 | Holmes ..................... 340/7.31 |
| 5,692,038 A | * | 11/1997 | Kraus et al. ........... 379/207.13 |
| 5,742,668 A | * | 4/1998 | Pepe et al. .................. 455/415 |
| 5,940,740 A | * | 8/1999 | Aas et al. .................... 340/7.22 |
| 6,035,031 A | * | 3/2000 | Silverman .............. 379/209.01 |
| 6,044,247 A | * | 3/2000 | Taskett et al. ............. 340/7.28 |
| 6,154,530 A | * | 11/2000 | Letellier ................. 379/142.06 |
| 6,192,218 B1 | * | 2/2001 | Laufmann et al. ......... 340/7.53 |
| 6,278,862 B1 | * | 8/2001 | Henderson ................... 340/7.2 |

* cited by examiner

*Primary Examiner*—Edwin C. Holloway, III

(57) ABSTRACT

For use in a paging network, a system for, and method of, providing ancillary page information. In one embodiment, the system includes: (1) an ancillary information collector, associated with a page call-in center of the paging network, that derives party identification information ancillary to a page request received by the page call-in center and (2) an ancillary information transmitter, associated with the page call-in center, that automatically transmits at least some of the party identification information to a pager associated with a paged party.

21 Claims, 2 Drawing Sheets

SYSTEM AND METHOD FOR PROVIDING ANCILLARY PAGE INFORMATION

TECHNICAL FIELD OF THE INVENTION

The present invention is directed, in general, to a paging system and, more specifically, to providing ancillary page information for use in a pager.

BACKGROUND OF THE INVENTION

The speed at which today's society expects and even demands information concerning identity of the sender is growing at an unprecedented rate. Often, the success of a particular business arrangement or, in some cases, the success of the business itself depends upon the ability of several parties to know who they are communicating with and their location. This need is also growing rapidly in many arenas outside that of business as well. The parties may be mobile and unable to transfer the desired information at a particular location due to security problems or other reasons. A sending party, whose location is not precisely known, may need to indicate to a receiving party that another time and place is more appropriate for a communication to occur. Both the sending and receiving parties may require some type of verification of the other for security reasons.

Pagers are one of the most popular ways that a sending party and a receiving party may initiate a communication. Pagers are inexpensive to own and operate and may be left operational for extended periods of time, making them essentially universally available. Many pagers in use today only display a call-back number of a sending party. If the receiving party does not readily recognize the call-back number, the receiving party may not respond either in a timely manner or at all. There are many situations where a sending party may be forced to use a call-back number that is different than one normally used, such as accidents, emergencies and while traveling. These situations, if occurring at other than expected times, may not receive the priority from the receiving party that was expected or hoped for by the sending party.

Often, by the time that the receiving party responds, the call-back number is no longer valid for the sending party and the communication is lost or delayed. The ability of the receiving party to quickly determine the nature and response time appropriate to a call-back number may be critical to the success of both business and other communications. Therefore, what is needed in the art is a way to effectively and efficiently provide ancillary information to a pager.

SUMMARY OF THE INVENTION

To address the above-discussed deficiencies of the prior art, the present invention provides a system for, and a method of, providing ancillary page information for use in a paging network. In one embodiment, the system includes: (1) an ancillary information collector, associated with a page call-in center of the paging network, that derives party identification information ancillary to a page request received by the page call-in center and (2) an ancillary information transmitter, associated with the page call-in center, that automatically transmits at least some of the party identification information to a pager associated with a paged party.

The present invention therefore introduces the broad concept of providing the recipient of a page with additional information that may be used to determine how the recipient of the page will respond. The additional information may provide caller ID information that has been modified to accommodate a special circumstance related to a caller. This information is made available to the page recipient in a form that allows an appropriate and timely response. The present invention is also advantageous to the caller in that a call-back phone number may be communicated automatically. Alternately the call-back number may be a special one-time event or identified from a priority list of call-back numbers.

In one embodiment of the present invention, the ancillary information collector derives the party identification information from a public telephone network associated with a paging party. Of course, the telephone network may also be a private network or a combination network consisting of public and private segments.

In one embodiment of the present invention, the ancillary information collector prompts a paging party for at least some of the party identification information. The paging party may respond to the ancillary information collector in a variety of ways and provide more information than has been requested or that may be accommodated by a particular pager associated with a paged party.

In one embodiment of the present invention, the ancillary information collector recognizes a voice of a paging party to receive at least some of the party identification information. The use of voice recognition allows positive identification of the paging party. Additionally, speech recognition may be advantageously employed to facilitate an interaction between the paged party and the ancillary information collector.

In one embodiment of the present invention, the party identification information is selected from the group consisting of: (1) caller identification information, (2) name information and (3) location information. Of course, many other information groups may be used for selection to accommodate both general and special situations for a paging party and to meet the requirements of a paged party.

In one embodiment of the present invention, the ancillary information collector derives the party identification information from a database associated with the page call-in center. The database may contain a wide spectrum of paging party information from which to choose and select. Conversely, the database may contain only a minimal amount of ancillary information such as a paging party name.

In one embodiment of the present invention, the pager is selected from the group consisting of: (1) an alphanumeric pager, (2) personal digital assistant (PDA) and (3) a cell phone. Of course, other appropriate existing or future-developed devices may also be used as a pager.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
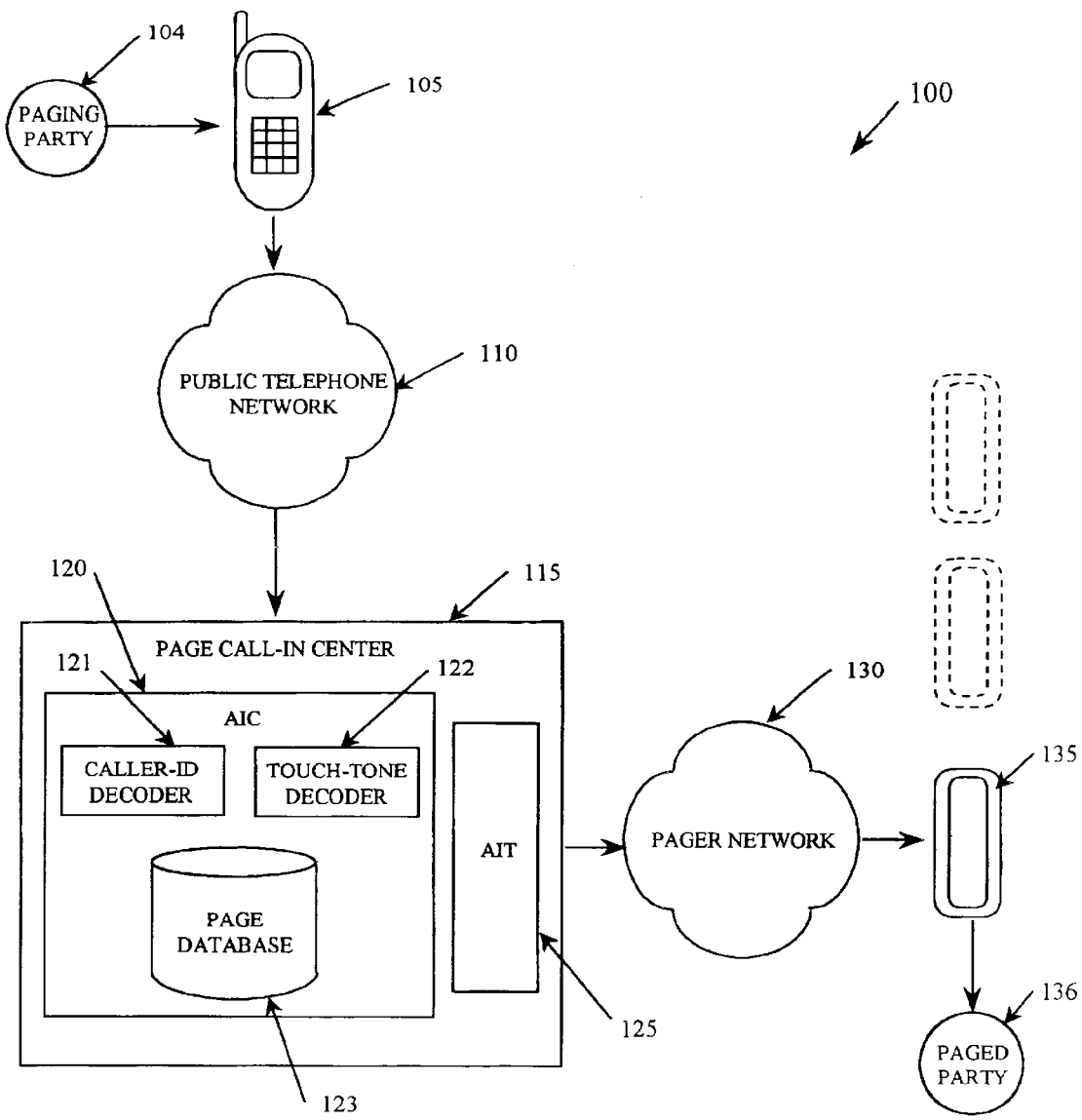
FIG. 1 illustrates a system diagram showing an embodiment of an infrastructure of a paging network for providing information ancillary to a page request.

Referring initially to FIG. 1, illustrated is a system diagram showing an embodiment of an infrastructure of a paging network for providing information ancillary to a page request, generally designated 100. The paging network 100 includes a paging party 104 associated with a source phone 105, a public telephone network 110, a page call-in-center 115, a pager network 130 and a pager 135 associated with a paged party 136. The pager 135 may include an alphanumeric pager, a personal digital assistant (PDA), a cell phone or another appropriate device that may be used to receive a page. Other embodiments of the present invention may include any number of paging parties 104, source phones 105 and pagers 135 associated with pageable parties 136.

In the illustrated embodiment, the paging party 104, using the source phone 105, sends page requests to the page call-in center 115 via the public telephone network 110. Other embodiments of the present invention may use networks that contain private network segments or a combination of public and private networks. The page call-in center 115 also receives ancillary information associated with each page request.

The ancillary information received at the page call-in center 115 may take the form of caller-ID information. Alternately, the paging party 104 may use the source phone 105 to provide ancillary information. The paging party 104 may provide substitute or supplementary ancillary information via the touch pad of the source phone 105 or use other types of electronic devices that can communication through the public telephone network 110. Additionally, the paging network 100 may obtain the ancillary information from the paging party 104 through voice or speech recognition.

Associated with the page call-in center 115 is an ancillary information collector ("AIC") 120. The AIC 120 includes a caller-ID decoder 121, a touch-tone decoder 122 (also called a DTFM decoder) and a page database 123. Additionally in this embodiment, the AIC 120 possesses the capabilities of voice or speech synthesis and both voice and speech recognition.

The AIC 120 processes the ancillary information received by the page call-in center 115 in a variety of ways. If caller-ID information is provided, the AIC 120 employs the caller-ID decoder 121 to determine a name associated with the telephone number of the source phone 105. In this embodiment, the AIC 120 responds, using synthesized speech, to verify the name of the paging party 104. The paging party 104 may then respond either by using the touch pad associated with the source phone 105 or by speech.

If the response is affirmative, the paging party 104 may use a spoken word to confirm. If the paging party 104 wishes to use another name, that name may be entered via the touch pad either by spelling the name of the paging party 104 or by entering a predetermined code that instructs the AIC 120 to perform another processing function.

In the illustrated embodiment, the paging party 104 may use the touch pad of the source phone 105 for the number zero (0), the number one (1), the symbol star (★) or the symbol pound (#) to indicate that a special code is to be entered. This special code is recognized by the AIC 120 using the touch-tone decoder 122 and the page database 123. The touch-tone decoder 122 decodes the touch-tone sequence that is entered by the paging party 104 using the touch pads of the source phone 105. Each of the numbers 0, 1 or the symbols ★, # may indicate classes of special instructions. Of course, combinations of these numbers and symbols may be used to define additional classes of instructions.

A class of special instructions may include a collection of names to be used to identify the paging party 104 to the AIC 120. For example, the paging party 104 may use the touch pad sequence 0 and then 2 to select their name or other pertinent ancillary information from the page database 123 to be sent to the paged party 136. Alternately, the caller may select another class of special instructions that would indicate to the paged party 136 that a specific time would be appropriate to contact the paging party 104. A sequence of special instructions may also be used, as appropriate to the capability of the pager 135, to display a number or even a sequence of predetermined messages. A sequence of interchanges may occur between the paging party 104 and the page call-in center 115 to verify the ancillary information or to prompt the paging party 104. Of course, one skilled in the art will understand that there are a broad range of possible uses for the classes of special instructions.

In one embodiment, the paging party 104 may also use voice to communicate with the page call-in center 115. The AIC 120 recognizes the voice of the paging party 104 to receive at least some of the party identification information. Voice recognition may be used to verify the identify of the paging party 104 and speech recognition may then be used to determine a spoken special instruction. Alternately, the paging party 104 may use voice and speech to indicate the ancillary information without reference to special instructions.

The AIC 120 may also use the page database 123 to provide a spectrum of paging party identification information. The paging party information may typically include at least caller-ID information, the paging party's name and the paging party's location. The page database 123 may also include alternate telephone numbers or other information that may be displayed on the pager 135. In other embodiments, the page network 100 may use the page database 123 to select and send display information specific to a receiving device. The receiving device may include wireless phones with displays, personal data assistant ("PDA"), hand-held computers, and other devices capable of receiving information via the pager network 130.

The ancillary information transmitter ("AIT") 125 is associated with the AIC 120 and automatically transmits the page request to the pager 135 via the pager network 130. The pager network 130 may include radio transmissions, satellite transmissions, cellular transmission and any combination there of. The AIT 125 also transmits the ancillary information received and/or obtained by the AIC 120. In another embodiment, the AIT 125 may transmit a selected subset or subsets of the ancillary information to the pager 135. The AIT 125 may also use the page database 123 to determine the capability of the pager 135 to receive and store the page request and ancillary information. The information that defines the capability of the pager 135 may be updated periodically as the paged party 136 modifies a capability of the pager 135.

Additionally, the paged party 136 may elect to carry more than one pager at a time. In this case, the AIC 120, working in concert with the AIT 125, may select an appropriate one of the pagers, represented by the pager 135 in FIG. 1, to receive the page and/or the ancillary information. This level of sophistication may require that the page call-in center 115 be able to control all of the pagers involved and know which pagers are currently in active use by the paged party 136. The paged party 136 must update the page call-in center 115 when a suite of active pagers changes. In another embodiment, the paging network 100 may poll or request information from the pagers associated with the paged party 136 to determine which are active and their associated capabilities.

Figure 2:
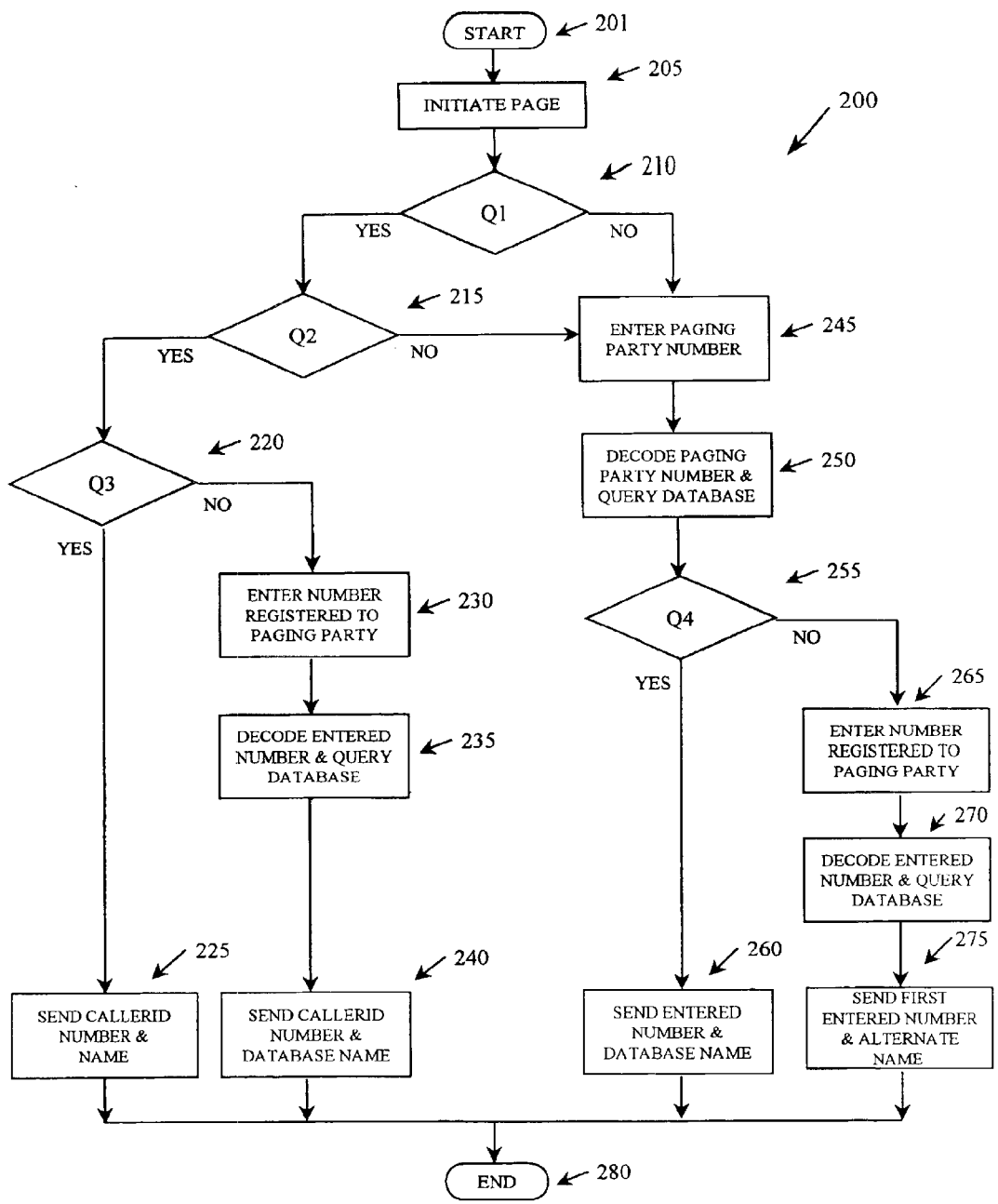
FIG. 2 illustrates a flow diagram showing an embodiment of a method employed by the paging network of FIG. 1.

Turning now to FIG. 2, illustrated is a flow diagram showing an embodiment of a method 200 employed by the paging network 100 of FIG. 1. The method 200 starts in a step 201 when a paging party desires to contact a paged party. A page is initiated in a step 205 with the paging party using a source phone to contact a page call-in center via a telephone network. The page call-in center responds to a first question Q1, in a step 210, to determine if there is a caller-ID associated with the source phone used by the paging party. If the answer to the first question Q1 is "yes", the page call-in center decodes the source phone number using a caller-ID decoder contained in an ancillary information collector and responds to the paging party with a second question Q2, in a step 215.

The second question Q2 of the step 215 queries the paging party to verify that the source phone number identified by the caller-ID decoder is the one to be sent to the paged party. The page call-in center uses synthesized voice to present the second question Q2 to the paging party. If the answer to the second question Q2 is "yes", the page call-in center then queries the paging party using synthesized voice with a third question Q3, in a step 220. The third question Q3, in the step 220, verifies with the paging party that the name associated with the caller-ID of the source phone number is to be sent to the paged party.

If the answer to the third question Q3 is "yes", the page call-in center employs an ancillary information transmitter to send the number and name associated with the caller-ID of the source phone to the paged party. This information is sent through a pager network to a pager associated with the paged party. The paging party responds using speech in this embodiment but may use the touch pads of the source phone at alternate times or in alternate embodiments. Once the information is sent to the paged party, the processing is stopped in a step 280.

If the answer to the third question Q3 in the step 220 is "no", the page call-in center uses synthesized voice to query the paging party for a special code or a telephone number to identify the paging party, in a step 230. Then in the step 230, the paging party supplies the desired telephone number using voice. In a step 235, the page call-in center recognizes the spoken telephone number and retrieves a paging party name associated with the telephone number from a page database contained in the ancillary information collector. The ancillary information collector may also use voice recognition techniques to verify that the paging party is indeed the person corresponding to the name in the page database, if a level of security or other reasons so merit.

In another embodiment, the page call-in center may use a touch-tone decoder to obtain all or part of the required information. Alternately, the caller may select another class of special instructions that would indicate to the paged party that a specific time would be appropriate to contact the paging party. A sequence of special instructions may also be used, as appropriate to the capability of the pager, to display a number or even a sequence of predetermined messages. A sequence of interchanges may occur between the paging party and the page call-in center to verify the ancillary information or to prompt the paging party. Of course, one skilled in the art will understand that there are a broad range of possible uses for the classes of special instructions.

Then in a step 240, the page call-in center sends the telephone number supplied by caller-ID and the paging party name retrieved from the page database to the pager of the paged party. Once the information is sent to the paged party, the processing is stopped in the step 280.

If the answer to the first question Q1 in the step 210 is "no" indicating that there is no caller-ID available from the source phone, the method 200 continues in a step 245. Additionally, if the answer to the second question Q2 in the step 215 is "no" indicating that the paging party does not want to use the telephone number associated with caller-ID, the method 200 also continues in the step 245. In the step 245 using synthesized voice, the page call-in center requests that the paging party supply the telephone number that is to be sent to the paged party. The paging party responds by entering the telephone number using the touch pads of the source phone, in the step 245.

Then in a step 250, the ancillary information collector uses the touch-tone decoder to determine the telephone number entered by the paging party and searches the page database to obtain a name associated with the telephone number for the paging party. The page call-in center then responds using synthesized voice, in a fourth question Q4 in a step 250, verifying that the database name is the one desired for use by the paging party. If the answer to the fourth question Q4 is "yes", the ancillary information transmitter associated with the page call-in center sends the entered number and database name to the pager associated with the paged party, in a step 260. Once the information is sent to the paged party, the processing is stopped in the step 280.

If the answer to the fourth question Q4 is "no", the page call-in center then requests that the paging party provide, using the touch pads of the source phone in this example, either a special code or another telephone number that may be used to retrieve a name to be associated with the paging party, in a step 265. Then in a step 270, the touch-tone message is again decoded and the appropriate paging party name is retrieved from the page database. The telephone number entered in the step 245 and the name retrieved in the step 270 are sent to the pager associated with the paged party. Once the information is sent to the paged party, the processing is stopped in the step 280. Of course, speech may also be used as an embodiment of the present invention dictates. Also, other embodiments of the present invention may have additional or fewer steps than described above.

In summary, the present invention introduces the broad concept of providing the paged party recipient of a page with additional information that may be used to determine how and when the paged party may respond. The additional information may provide caller ID information that has been modified to accommodate a special circumstance related to a paging party. This information is made available to the page recipient in a form that allows an appropriate and timely response. The present invention is also advantageous to the paging party in that a call-back phone number may be communicated automatically. Alternately the call-back number may be a special one-time event or identified from a priority list of call-back numbers.

Although the present invention has been described in detail, those skilled in the art should understand that they can make various changes, substitutions and alterations herein without departing from the spirit and scope of the invention in its broadest form.

What is claimed is:

1. For use in a paging network, a system for providing ancillary page information, comprising:
   an ancillary information collector, associated with a page call-in center of said paging network, being configured to derive party identification information ancillary to a page request received by said page call-in center, said ancillary information collector being configured to prompt a paging party to choose at least a portion of said party identification information to be sent to a paged party from a database; and
   an ancillary information transmitter, associated with said page call-in center, being configured to automatically transmit said at least a portion of said party identification information to a pager associated with said paged party based on a capability of said pager.

2. The system as recited in claim 1 wherein said ancillary information collector derives at least a portion of said party identification information from a public telephone network associated with said paging party.

3. The system as recited in claim 1 wherein said ancillary information collector derives said at least a portion of said party identification information by prompting said paging party to enter additional party identification information.

4. The system as recited in claim 1 wherein said ancillary information collector recognizes a voice of said paging party, said ancillary information collector prompting said paging party to choose said at least a portion of said party identification information from said database based upon said recognition of said voice.

5. The system as recited in claim 1 wherein said party identification information is selected from the group consisting of:
   caller identification information,
   name information, and
   location information.

6. The system as recited in claim 1 wherein said capability is associated with an ability of said pager to display said at least a portion of said party identification information.

7. The system as recited in claim 1 wherein said pager is selected from the group consisting of:
   an alphanumeric pager,
   a personal digital assistant (PDA), and
   a cell phone.

8. For use in a paging network, a method of providing ancillary page information, comprising:
   deriving party identification information ancillary to a page request received by a page call-in center, wherein at least a portion of said party identification information is obtained by an ancillary information collector prompting a paging party to choose said at least a portion of said party identification information from a database; and
   automatically transmitting said at least a portion of said party identification information to a pager associated with a paged party based on a capability of said pager.

9. The method as recited in claim 8 wherein said deriving comprises deriving said at least a portion of said party identification information from a public telephone network associated with said paging party.

10. The method as recited in claim 8 wherein said deriving comprises prompting said paging party to enter additional party identification information.

11. The method as recited in claim 8 wherein said deriving comprises recognizing a voice of said paging party, and prompting said paging party to choose said at least a portion of said party identification information from said database based upon said recognition of said voice.

12. The method as recited in claim 8 wherein said party identification information is selected from the group consisting of:
   caller identification information,
   name information, and
   location information.

13. The method as recited in claim 8 wherein said capability is associated with an ability of said pager to receive, display or store said at least a portion of said party identification information.

14. The method as recited in claim 8 wherein said pager is selected from the group consisting of:
   an alphanumeric pager,
   a personal digital assistant (PDA), and
   a cell phone.

15. A paging network infrastructure, comprising:
   a plurality of pagers having pageable parties associated therewith;
   a page call-in center that selectively communicates with ones of said plurality of pagers;
   an ancillary information collector, associated with said page call-in center, that derives party identification information ancillary to a page request received by said page call-in center, wherein said ancillary information collector prompts a paging party to choose at least a portion of said party identification information to be sent to a paged party from a database; and
   an ancillary information transmitter, associated with said page call-in center, that automatically transmits said at least a portion of said party identification information to one of said plurality of pagers based on a capability of said one of said pagers.

16. The paging infrastructure as recited in claim 15 wherein said ancillary information collector derives said at least a portion of said party identification information from a public telephone network associated with said paging party.

17. The paging infrastructure as recited in claim 15 wherein said ancillary information collector derives said at least a portion of said party identification information by prompting said paging party to enter additional party identification information.

18. The paging infrastructure as recited in claim 15 wherein said ancillary information collector recognizes a voice of said paging party, said ancillary information collector prompting said paging party to choose said at least a portion of said party identification information from said database based upon said recognition of said voice.

19. The paging infrastructure as recited in claim 15 wherein said party identification information is selected from the group consisting of:
   caller identification information,
   name information, and
   location information.

20. The paging infrastructure as recited in claim 15 wherein said capability is associated with an ability of said one of said pagers to receive, display or store said at least a portion of said party identification information.

21. The paging infrastructure as recited in claim 15 wherein said pager is selected from the group consisting of:
   an alphanumeric pager,
   a personal digital assistant (PDA), and
   a cell phone.

* * * * *